Oct. 23, 1956  E. L. HOPKINS  2,767,510
AERATED LIVE BAIT BUCKET ASSEMBLY
Filed July 22, 1954
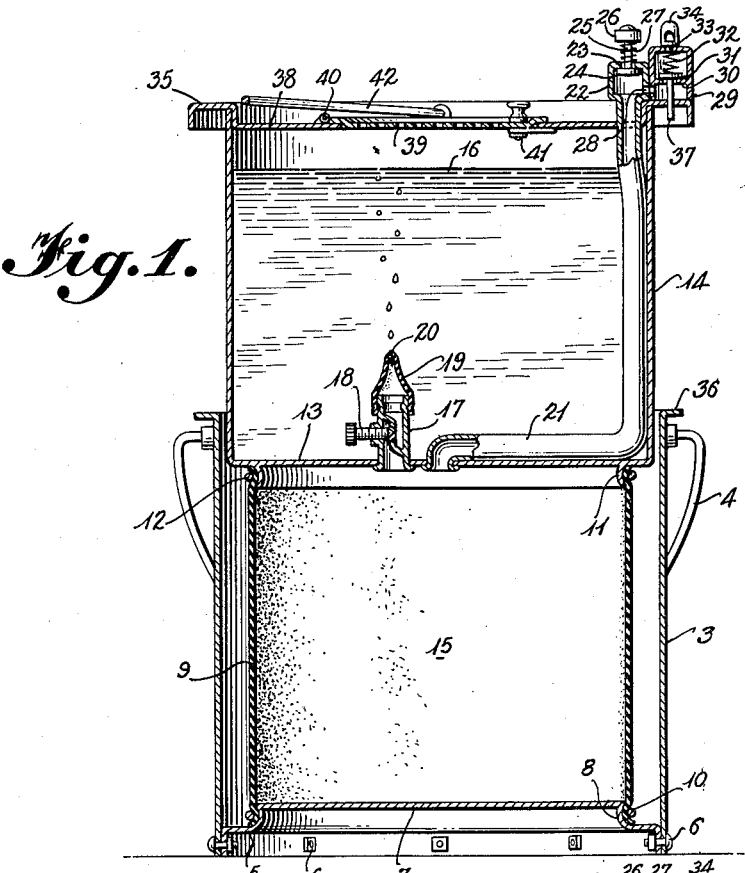
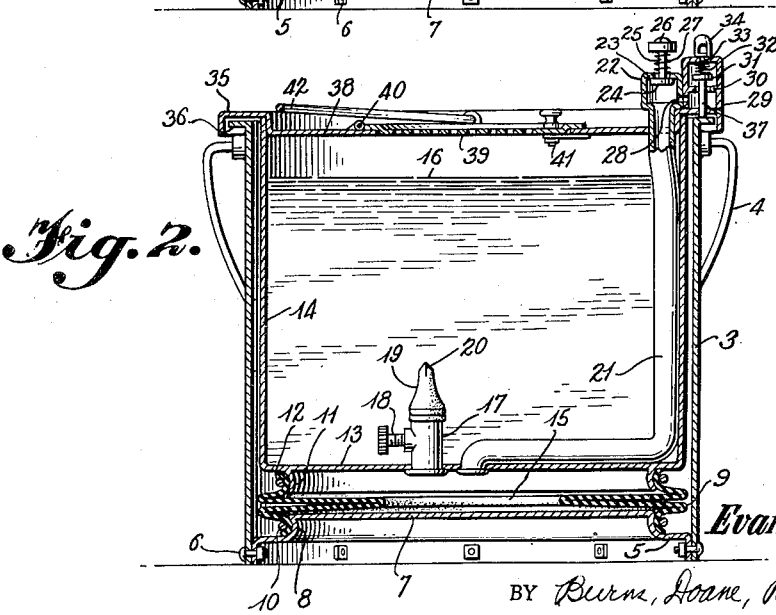
INVENTOR
*Evan L. Hopkins*
BY *Burns, Doane, Benedict & Swope*
ATTORNEYS

United States Patent Office 2,767,510
Patented Oct. 23, 1956

2,767,510

AERATED LIVE BAIT BUCKET ASSEMBLY

Evan L. Hopkins, Emporia, Kans.

Application July 22, 1954, Serial No. 445,040

2 Claims. (Cl. 43—57)

The present invention relates to improvements in aerated live bait bucket assemblies.

Live bait, such as minnows, used in angling must frequently be transported some distance to the point of use. The live bait must also be kept alive until the angling excursion is terminated. Live baits, and particularly minnows, require that the water in which they swim have an adequate supply of air or oxygen. Various arrangements have heretofore been proposed for causing air to bubble through the water to assure a sufficient supply of oxygen. Such devices have usually been complex and expensive or have required frequent and time-consuming attention on the part of the angler to make certain that air continues to bubble through the water. My invention provides a simple and inexpensive live bait bucket assembly in which air is caused to bubble through the water for prolonged intervals without attention on the part of the angler. My assembly also permits the angler to easily and quickly condition the assembly to renew a supply of air which is to be bubbled through the water. The invention assures that the pressure of the air supply will be maintained sufficiently high to eliminate the possibility of air ceasing to bubble through the water. My assembly may also provide a warning to indicate to the angler that the condition of the assembly is such as to require replenishment of the air supply.

The invention may be briefly described as including a large, collapsible bellows and a liquid container secured thereto. The liquid container is positioned above and has its weight supported by the collapsible bellows. Air within the bellows is thus compressed. A restricted passageway is provided between the collapsible bellows and the lower portion of the liquid container to permit air to flow from the bellows into the liquid in the container. The restriction in this passageway may be adjustable to control the rate at which air is expelled from the bellows into the liquid.

A second passageway places the air chamber within the bellows in communication with the atmosphere. This second passageway is provided with a check valve which normally prevents escape of air from the bellows to the atmosphere but permits air to flow from the atmosphere into the interior of the bellows when the bellows is expanded by manually lifting the liquid container. The check valve is capable of being manually opened to permit air to be rapidly exhausted from the bellows when it is desired to collapse the bellows for storage of the assembly. There may be provided an air whistle which can be placed in communication with the air pressure within the bellows by means of a whistle valve. The whistle valve is normally closed and is arranged to be opened automatically to blow the whistle when the bellows approaches collapsed condition. The angler is thus warned that the liquid container should be manually elevated to replenish the air supply within the bellows. Means are also provided to assure that liquid will not flow from the liquid container into the air chamber of the collapsible bellows. The horizontal cross-sectional area of the liquid container is greater than the average horizontal cross-sectional area of the bellows to assure that the air pressure within the bellows will always be sufficient to force air from the bellows through the restricted passageway into the liquid in the liquid container.

Among the objects of the invention are to provide a simple and inexpensive aerated live bait bucket assembly which will provide a supply of air for a prolonged interval, which can be easily and quickly manipulated to replenish the supply of air, which will maintain the supply of air under sufficient pressure to assure that air will be caused to bubble through the liquid in the liquid container, which can be quickly collapsed for convenient storage, which includes provision for adjusting the rate at which air is expelled into the liquid in the liquid container, which has provision for preventing loss of liquid from the liquid container into the air chamber within the bellows, and which may provide a warning signal to indicate to the angler that the condition of the assembly is such as to require replenishment of the air supply.

The foregoing and other objects and advantages of the invention will be more fully understood by reference to the following detailed description and the accompanying drawing which illustrates what I now consider to be the preferred embodiment of my invention.

In the drawing:

Figure 1 is a vertical cross-sectional view of the bait bucket assembly showing the parts thereof in fully expanded condition; and, Figure 2 is a similar cross-sectional view showing the parts of the assembly just prior to reaching fully collapsed condition.

The assembly includes an outer shell 3 which is provided with a suitable bail 4 for convenient carrying of the assembly. A disk 5 is secured to the lower end of the shell 3 by any suitable means such as bolts 6. The disk 5 has a central imperforate portion 7 which is offset upwardly, as shown, to provide an outwardly facing shoulder portion 8.

A tubular member 9 of rubber or other air impervious flexible and pliable material has its lower end secured around the shoulder 8 by means of a band 10. The upper end of the tubular member 9 is secured around a circular flange 11 by means of a band 12. The circular flange 11 is secured to the lower surface of the bottom portion 13 of the liquid container 14. The tubular member 9 thus cooperates with the central portion 7 of the disk 5 and the central portion 13 of the bottom of the liquid container 14 to form a collapsible bellows having an internal air chamber 15.

The external diameter of the liquid container 14 is smaller than the internal diameter of the shell 3 to permit the liquid container to move freely from the position shown in Figure 1 to the position shown in Figure 2, and vice versa. The liquid container 14 may contain water up to, for example, the level 16.

A first passageway 17 provides communication between the air chamber 15 and the interior of the liquid container 14. This passageway is provided with a valve such as a needle valve 18 for adjustably restricting flow of air from the air chamber 15 into the liquid container 14. A nipple-like element 19 of rubber or other flexible material covers the upper end of the passageway 17. The upper portion of the nipple-like element 19 is provided with a slit 20 which opens to permit air to flow from the air chamber 15 into the interior of the liquid container and which closes to prevent flow of water from the liquid container 14 downwardly through the passageway 17 into the air chamber 15.

A second passageway 21 communicates at its lower end with the air chamber 15. The passageway 21 extends upwardly through the interior of the liquid container 14 and terminates in a valve housing 22 having a valve seat 23. A valve closure element 24 is provided with an upwardly extending stem 25 and a push button 26. A light compression spring member 27 normally holds the valve closure element 24 in sealing engagement with the valve seat 23.

A third passageway 28 extends laterally from adjacent the upper end of the second passageway 21 into the interior of a whistle valve casing 29. The valve casing 29 is provided with a valve seat 30. A valve closure element 31 is normally retained in sealing engagement with the valve seat 30 by means of a compression spring member 32. An opening 33 in the upper end of the valve casing 29 communicates with the interior of an air whistle 34. The valve casing 29 is mounted on the upper surface of an annular flange 35 which is secured to the upper end of the liquid container 14. The upper end of the shell 3 is provided with an annular flange 36. The valve closure element 31 is provided with a downwardly extending stem 37 which is arranged to engage the upper surface of the flange 36 to open the whistle valve in the manner hereinafter described.

The liquid container 14 is provided with a top portion 38 having a perforated door 39 which is hinged at 40 and provided with a latch member 41. The liquid container 14 is also provided with a suitable bail 42.

The operation and manner of use of the assembly will now be briefly described. A supply of water is placed in the liquid container 14 and the minnows or other live bait are added thereto. It will be assumed for purposes of discussion that the parts of the assembly initially occupy the positions shown in Figure 1. The weight of the liquid container 14 and of the water and bait therein is supported by air within the air chamber 15, and the air within that chamber is thus compressed. Attention is called to the fact that the horizontal cross-sectional area of the liquid container 14 is greater than the average horizontal cross-sectional area of the tubular member 9 which defines the side walls of the air chamber 15. This relationship assures that the air pressure within the air chamber 15 will be adequate to assure proper operation of the assembly. Under the conditions just described, the valve closure element 24 will be seated against the seat 23 and the valve closure element 31 will be held in engagement with the valve seat 30 by means of the compression spring member 32. Under these conditions, air can escape from the air chamber 15 only through the first passageway 17 and through the slit 20 in the nipple-like member 19. The air thus escaping will bubble upwardly through the water and will supply adequate oxygen to the bait therein. The angler may open the door 39 and observe the rate at which air is bubbling upwardly through the liquid. Appropriate adjustment of this rate can be obtained by adjustment of the needle valve 18.

Air will continue to bubble upwardly through the water in the foregoing manner and the liquid container 14 will gradually descend within the interior of the shell 3 toward the position illustrated in Figure 2. The shell 3 contains no liquid. The air pressure within the air chamber 15 will remain substantially constant while the liquid container 14 is descending from the position shown in Figure 1 to that shown in Figure 2.

Figure 2 illustrates the valve stem 37 in engagement with the upper surface of the flange 36, and the valve closure member 31 has been lifted from its seat 30. Air is thus permitted to flow from the air chamber 15 through the passageway 21 and the third passageway 28 to the opening 33 in the valve casing 29, and thence to the air whistle 34. The air whistle 34 will thus be caused to emit a whistling sound which serves as a warning to the angler that the air supply within the air chamber 15 is about to become exhausted and that the assembly requires attention. The angler then grasps the bail 42 and manually lifts the liquid container 14 to the position shown in Figure 1. During this lifting movement the valve closure member 31 will reseat on the seat 30. The valve closure member 24 is withdrawn from its seat 23 against the action of the light spring member 27 to thereby permit air from the atmosphere to flow through the second passageway 21 into the air chamber 15. As soon as the lifting movement is discontinued, the valve closure element 24 is returned to its seat 23 by the action of the spring member 27 and the assembly requires no further attention until a sound is again emitted by the whistle 34 in the manner described above. During this lifting movement of the liquid container 14, the air pressure within the air chamber 15 will be slightly below atmospheric pressure, but at this time the slit 20 in the nipple-like element 19 closes and prevents liquid from flowing through the passageway 17 into the air chamber.

Upon conclusion of the angling excursion, it may be desired to collapse the air chamber 15 and to telescope the liquid container 14 into the shell 3. This may be quickly accomplished by depressing the push button 26 which removes the valve closure member 24 from its seat 23 and permits air within the air chamber 15 to be quickly expelled to atmosphere.

While I have described my invention with reference to the structure specifically illustrated in the drawing, it is understood that various modifications and alterations may be made without departing from the broader scope of the invention as defined by the following claims.

Having thus described my invention, I claim:

1. An aerating bucket for live bait comprising a liquid container, a collapsible air chamber, said liquid container being positioned above and arranged to be supported by said air chamber to thereby compress air within said air chamber to a pressure substantially above atmospheric pressure, a passageway between said air chamber and said liquid container for air flow from said chamber into liquid within said container, means permitting flow of air from atmosphere to said chamber upon lifting of said liquid container to effect expansion of said chamber, an air whistle communicating with said air chamber, a normally closed valve preventing flow of air from said air chamber to said whistle, and means operative to open said valve upon said air chamber approaching collapsed condition.

2. An aerating bucket for live bait comprising a liquid container, a collapsible air chamber, said liquid container being positioned above and arranged to be supported by said air chamber to thereby compress air within said air chamber to a pressure substantially above atmospheric pressure, a passageway between said air chamber and said liquid container for air flow from said chamber into liquid within said container, a second passageway leading from said air chamber to atmosphere, a check valve in said second passageway permitting flow of air from atmosphere to said chamber upon lifting of said liquid container to effect expansion of said chamber, an air whistle, a third passageway providing communication between said whistle and the air pressure within said air chamber, normally closed valve means in said third passageway, and means operative to open said valve means upon said air chamber approaching collapsed condition.

References Cited in the file of this patent

UNITED STATES PATENTS

| | | |
|---|---|---|
| 724,539 | Bourne | Apr. 7, 1903 |
| 754,847 | Clark | Mar. 15, 1904 |
| 1,215,782 | Diamond | Feb. 13, 1917 |
| 1,325,918 | Valiton | Dec. 23, 1919 |
| 2,570,684 | Jackson | Oct. 9, 1951 |
| 2,636,308 | Demmer | Apr. 28, 1953 |
| 2,664,241 | Sunday | Dec. 29, 1953 |
| 2,689,428 | Stosberg | Sept. 21, 1954 |
| 2,721,027 | Schwartz | Oct. 18, 1955 |

FOREIGN PATENTS

| | | |
|---|---|---|
| 562,190 | Great Britain | June 21, 1944 |